United States Patent [19]
Carr

[11] 3,907,000
[45] Sept. 23, 1975

[54] HYDRO-PNEUMATIC FLEXIBLE BLADDER ACCUMULATOR

[75] Inventor: George J. Carr, Gardena, Calif.

[73] Assignee: Teledyne Sprague Engineering, a division of Teledyne, Inc., Gardena, Calif.

[22] Filed: Apr. 25, 1974

[21] Appl. No.: 464,184

[52] U.S. Cl. .................. 138/30; 92/92; 92/102
[51] Int. Cl.² ........................................ F16L 55/04
[58] Field of Search ......... 138/30; 92/102, 98 R, 92

[56] References Cited
UNITED STATES PATENTS

| | | | |
|---|---|---|---|
| 2,504,424 | 4/1950 | Krook | 138/30 |
| 2,721,580 | 10/1955 | Greer | 138/30 |
| 3,368,586 | 2/1968 | French et al. | 138/30 |
| 3,477,473 | 11/1969 | Beabaud | 138/30 |
| 3,494,378 | 2/1970 | Greer | 138/30 |
| 3,674,053 | 7/1972 | Murman et al. | 138/30 |

Primary Examiner—John W. Huckert
Assistant Examiner—Charles Gorenstein
Attorney, Agent, or Firm—Jessup & Beecher

[57] ABSTRACT

A pressure vessel in the form of a hydro-pneumatic flexible bladder accumulator is provided which is formed of a cylindrical shell closed at one end and having an open mouth at the other end. An open-ended thimble-shaped deformable bladder of resilient material is positioned within the shell. A head is welded, or otherwise attached to the open mouth of the shell, and in one embodiment the head defines an annular skirt section on its inner face having a peripheral groove which serves to receive the open end of the bladder. One edge of the groove forms a lip at the end of the skirt section. The mouth of the bladder extends over the lip of the groove in a tight resilient fit with the skirt section, and with its rim interposed between the skirt section and the adjacent inner surface of the shell. An O-ring is mounted in the groove adjacent its other edge, and the O-ring is positioned under the rim of the bladder to form an effective seal for the interior of the bladder. The sealing O-ring causes gas pressure in the bladder to force the rim of the bladder to be wedged tightly against the adjacent inner surface of the shell so as to obviate any tendency for the bladder to creep up into the space between the lip and the inner surface of the shell during the operation of the accumulator, which would result in wear and damage to the bladder. The bladder is firmly retained on the skirt section without the need for bonding, or otherwise affixing the bladder to the skirt. In a second embodiment the bladder is supported in like manner on the end of an internal sleeve within the shell.

3 Claims, 2 Drawing Figures

HYDRO-PNEUMATIC FLEXIBLE BLADDER ACCUMULATOR

BACKGROUND OF THE INVENTION

The present invention is concerned with a pressure vessel type of hydro-pneumatic accumulator which includes, for example, a thimble-shaped flexible bladder mounted in an outer shell, and which separates the interior of the shell into two chambers which are sealed from one another. The shell usually has a closed end. A port is formed in the closed end of the shell in communication with one of the two chambers within the shell. This port is usually referred to as the "liquid" port, and the adjacent chamber constitutes the "liquid" chamber of the accumulator. A head is usually mounted on the other end of the shell, and it includes a valved "gas" port which communicates with the other chamber within the shell, and which constitutes the "gas" chamber.

A compressible gas, such as nitrogen, is permanently charged and compressed under high pressure, and is introduced through the gas valve into the gas chamber of the accumulator. Subsequently, an appropriate hydraulic liquid under high pressure is pumped through the liquid port into the liquid chamber.

As the hydraulic liquid is pumped into the liquid chamber, the bladder is gradually forced into the gas chamber, further compressing the gas in the gas chamber until a balanced high pressure is reached in both the liquid and gas chambers. By this action, energy is stored or absorbed into the gas chamber of the accumulator, which tends to bias the hydraulic liquid out of the liquid chamber to enable the hydraulic liquid to perform useful work.

In the construction of accumulators of the type with which the present invention is concerned, and as explained above, the bladder is mounted within the the shell between the gas valve at one end and the liquid port at the other end. As also mentioned above, in the usual prior art construction, one end of the shell is open, and a head is usually welded to the shell to close the open end. This welding operation created problems in the prior art because the bladder was normally bonded to the shell prior to the welding operation, and the heat from the welding had a tendency to damage the bond and the bladder itself.

Attempts to overcome this problem in the prior art included the provision of an annular mounting sleeve which was bonded to the mouth of the bladder in coaxial relationship with the bladder, and which extended coaxially out from the mouth of the bladder. The opposite end of the sleeve was welded to the innerface of the head, or to the shell, to mount the bladder in position within the shell. With such a construction, the only heat passed from the head weld to the bladder bond was along the sleeve, and the sleeve was made sufficiently thin and sufficiently long so that any heat reaching the bladder bond was hopefully of insufficient intensity to damage the bond.

However, in order to perform its intended purpose, it was essential for the sleeve to support the bladder with its outer surface displaced radially inwardly from the inner surface of the shell, and although the construction was found to alleviate the problem of heat damage to the bladder bond, it was found that under pressure operating conditions a portion of the bladder adjacent the bond would "creep" up between the sleeve and the adjacent inner surface of the shell. This resulted in rapid wear and damage to the bladder.

In the construction of the present invention, a seal is provided between the lip of the bladder and the supporting member, and the rim of the bladder around its mouth is resiliently drawn up over a lip on the supporting structure and over the seal. In accordance with the concepts of the invention, the bladder is not bonded or in any way affixed to the supporting structure, so that when the interior of the bladder is pressurized during the charging operation, the rim of the bladder is tightly squeezed and compressed into the space between the lip and the adjacent inner surface of the shell. Therefore, there is no tendency for the bladder to "creep" into that space, so that there is no tendency for the bladder to become excessively worn or damaged. Moreover, the bladder is securely held on the lip of the supporting structure without any need for bonding it in any way to the lip.

DETAILED DESCRIPTION OF THE ILLUSTRATED EMBODIMENTS

Figure 1:
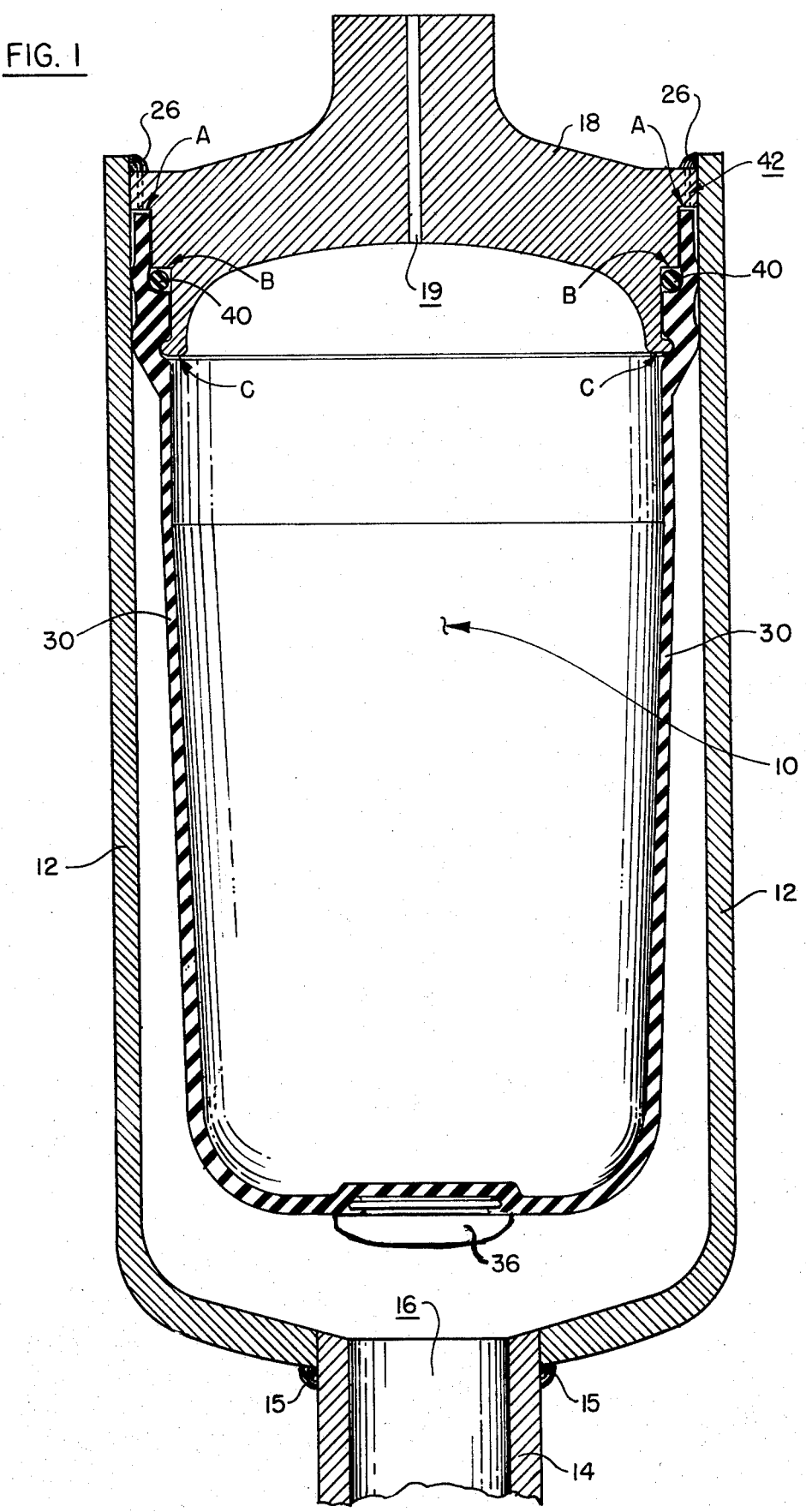
FIG. 1 is a side section of one embodiment of the invention in which the internal bladder is supported in the shell on a lip formed in the head of the assembly.

In the embodiment of FIG. 1, a hydro-pneumatic accumulator 10 is illustrated. The accumulator comprises an elongated metal cylindrical shell 12 having a closed end, with a liquid port 16 extending through the closed end. A fitting 14 is welded, or otherwise attached to the end of the shell 12 to define the port 16. The fitting is affixed to the shell by means, for example, of a weld designated 15. A metal head 18 is mounted on the open end of the shell 12 by means, for example, of a weld 26. A gas port 19 extends through the head 18, and a gas charging valve assembly (not shown) is affixed to the external surface of the head to surround the port 19.

The inner face of the head 18 includes a first skirt section having a reduced diameter which defines a first shoulder A, and the inner surface of the head includes a second skirt section having an additionally reduced diameter which defines a second shoulder B. The inner surface of the head is further shaped to define a lip C at its inner extremity, so that a peripheral groove is formed between the shoulder B and lip C.

A bladder 30, formed of an appropriate stretchable, resilient, deformable material, such as synthetic rubber, and having a thimble-like configuration, is mounted on the inner face of the head 18, as shown. Specifically, the outer rim of the bladder 30 adjacent its mouth is undercut, so that it may fit over the first section and against the shoulder A, as shown. An O-ring 40 is interposed between the resulting shoulder formed adjacent to the end of the bladder, and the shoulder B. A vent 42 is provided which extends to the shoulder A, to relieve any liquid which might find its way into the region between the lip of the bladder and the adjacent inner surface of the shell.

An anti-extrusion button 36 is bonded to the closed end wall of the bladder 30, and this button functions both as a seat against the liquid port 16, and it also serves to prevent the end of the bladder from extruding into the port with resulting destruction of the bladder.

During the gas charging operation, a pressurized gas, such as dry nitrogen, is introduced through the port 19 into the interior of the bladder 10. As the internal pressure within the bladder 10 rises, and due to the sealing action of the O-ring 40, the rim of the bladder is wedged into the space between it and the inner wall of the shell 12. This precludes any tendency for the bladder to "creep" into that space with resulting wear and damage to the bladder, or for the bladder to be pulled off the skirt section of the head 18.

Figure 2:
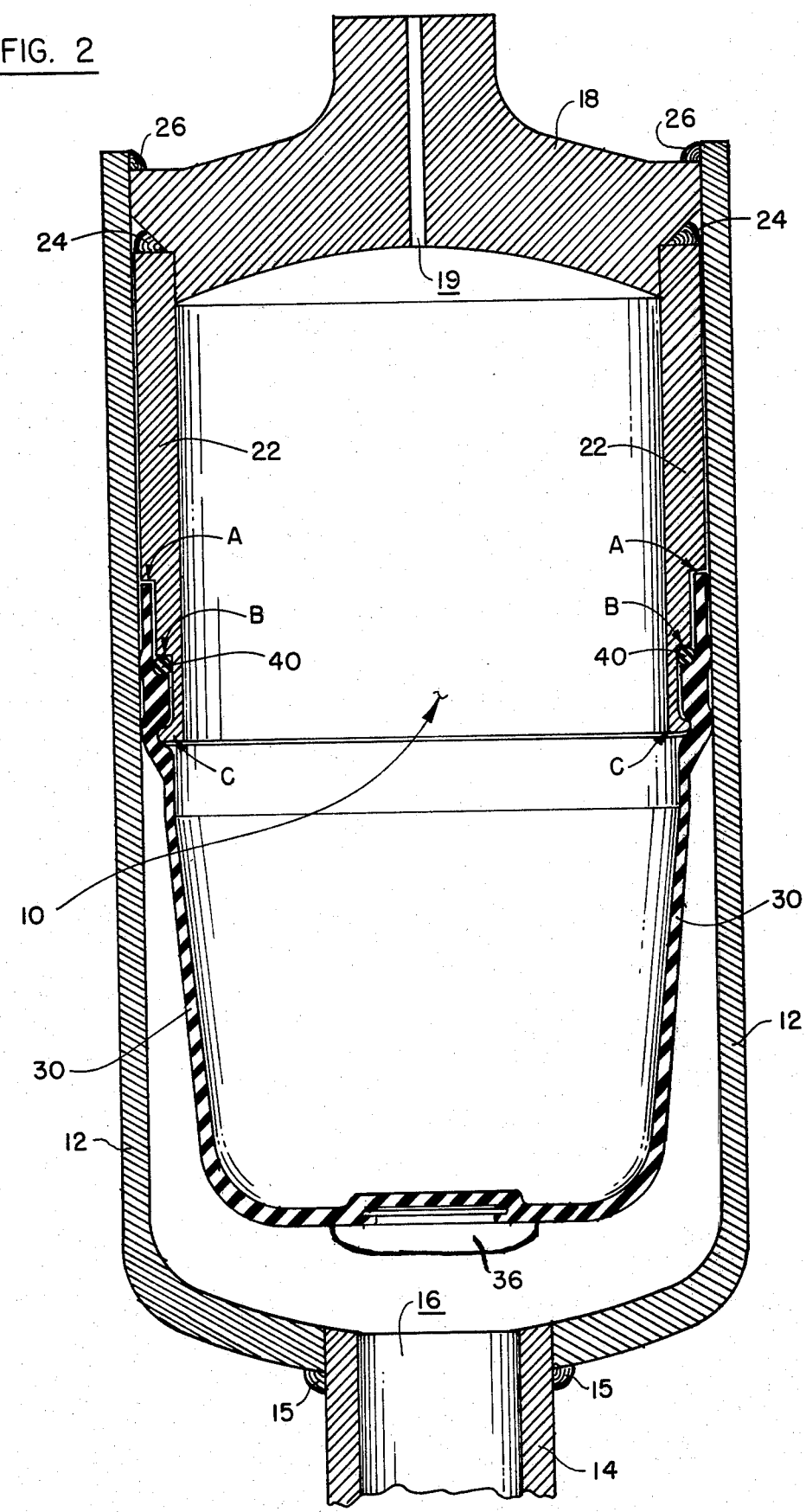
FIG. 2 is a side section of another embodiment of the invention in which the internal bladder is supported in the shell on a lip formed at the end of an internal sleeve which, in turn, is welded to the inner face of the head.

The embodiment of the invention shown in FIG. 2 is essentially the same as the embodiment of FIG. 1, except that a sleeve 22 is provided which is attached to the inner face of the head 18 by means, for example, of a weld 24. The bladder 30 is mounted on the end of the sleeve, rather than directly on the head, as was the case in FIG. 1. As shown in FIG. 2, the bladder may be mounted on the sleeve in the same manner as it is mounted on the head in the embodiment of FIG. 1. The operation of the embodiment of FIG. 2, is the same as that of FIG. 1.

The invention provides, therefore, an improved hydropneumatic flexible bladder accumulator, in which the bladder is firmly and securely mounted within the shell without the need for bonding it to its supporting structure, and in which the bladder is supported in a manner such that there is no tendency for the bladder to sustain excessive wear during the operation of the accumulator.

It will be appreciated that while particular embodiments of the invention have been shown and described, modifications may be made. It is intended in the claims to cover the modifications which come within the spirit and scope of the invention.

What is claimed is:

1. A hydro-pneumatic accumulator comprising: an elongated shell having a liquid port at one end and a gas port at the other end; a supporting structure fixed to said shell and defining a first annular skirt section of reduced diameter forming a first shoulder, and a second annular skirt section of further reduced diameter, the first and second skirt sections being displaced radially inwardly from the inner surface of said shell, and the second skirt section forming a second shoulder and having a lip at the end thereof and forming a peripheral groove between the lip and the second shoulder; an O-ring extending around said groove adjacent to the second shoulder; and a thimble-shaped bladder of resilient, deformable material mounted in said shell between the liquid port and the gas port with its mouth extending over said first and second annular skirt sections of said supporting structure in resilient engagement therewith; and with the rim of the bladder extending into the space between the first and second skirt sections and the inner surface of said shell, over the lip of the second skirt section and over the O-ring, and said rim having an undercut end portion which extends over the first skirt section.

2. The hydro-pneumatic accumulator defined in claim 1, in which said supporting structure comprises a head enclosing one end of the elongated shell.

3. The hydro-pneumatic accumulator defined in claim 1, and which includes a head enclosing one end of the shell, and in which said supporting structure comprises a coaxial sleeve affixed to said head.

* * * * *